United States Patent [19]
Iizuka

[11] Patent Number: 5,844,592
[45] Date of Patent: Dec. 1, 1998

[54] OPTICAL IMAGE FORMING DEVICE HAVING A PLURALITY OF DRAWING BEAMS AND A MONITORING BEAM

[75] Inventor: Takashi Iizuka, Tokyo, Japan

[73] Assignee: Asahi Kogaku Kogyo Kabushiki Kaisha, Tokyo, Japan

[21] Appl. No.: 684,919

[22] Filed: Jul. 22, 1996

Related U.S. Application Data

[63] Continuation of Ser. No. 269,123, Jun. 30, 1994, abandoned.

[30] Foreign Application Priority Data

Jun. 30, 1993 [JP] Japan ................................ 5-187397

[51] Int. Cl.$^6$ ............................... B41J 2/47; B41J 2/435; G01D 15/14; G02F 1/11
[52] U.S. Cl. ......................... 347/239; 347/241; 347/232
[58] Field of Search .................................. 347/239, 244, 347/241, 232, 255, 256; 359/636, 246, 285, 305; 348/754, 769; 372/13; 385/7

[56] References Cited

U.S. PATENT DOCUMENTS

| | | |
|---|---|---|
| 4,796,038 | 1/1989 | Allen et al. .............................. 347/255 |
| 4,797,696 | 1/1989 | Allen et al. .............................. 359/636 |
| 5,001,341 | 3/1991 | Negishi .................................... 250/235 |
| 5,015,846 | 5/1991 | Okayama et al. ....................... 250/235 |
| 5,087,813 | 2/1992 | Negishi .................................... 250/236 |
| 5,140,342 | 8/1992 | Metildi et al. .......................... 347/232 |
| 5,194,981 | 3/1993 | Morimoto ................................ 347/244 |

*Primary Examiner*—N. Le
*Assistant Examiner*—Raquel Yvette Gordon
*Attorney, Agent, or Firm*—Greenblum & Bernstein P.L.C.

[57] ABSTRACT

An optical image forming device includes a scanning lens for scanning, in a main scanning direction, eight drawing beams on an image plane. A monitoring beam is scanned repeatedly and simultaneously with the drawing beams in a predetermined scanning range. The eight drawing beams are scanned such that drawing beams adjacent each other in a sub-scanning direction pass a same position in the scanning range on the image plane at a different time. The monitoring beam is scanned prior to scanning of the drawing beam. A scale clock generator is provided for generating scale clock signals identifying positions of the monitoring beam in the scanning range. A modulator modulates the eight drawing beams such that modulations for each of the drawing beams at a same position in the scanning range are synchronized with a timing of a same scale clock signal obtained by the scale clock generator.

20 Claims, 8 Drawing Sheets

OPTICAL IMAGE FORMING DEVICE HAVING A PLURALITY OF DRAWING BEAMS AND A MONITORING BEAM

This application is a continuation of application Ser. No. 08/269,123, filed Jun. 30, 1994, now abandoned.

BACKGROUND OF THE INVENTION

1. Field of the Invention

The present invention relates to an optical image forming device using multiple beams.

2. Description of Related Art

Optical scanners used in printers or plotters or similar devices, use light, (referred to as a drawing beam or beams) modulated in accordance with the image to be drawn, and deflected in the main scanning direction by an optical deflector. The deflected drawing light (referred to as drawing scanning beam or beams) is made incident upon a subject to be scanned, such as a photosensitive medium, to draw printed data onto the subject. The scanning speed of the drawing scanning beams on the subject is kept constant by an f-θ lens provided between the deflector and the subject.

In the optical scanner mentioned above, error characteristics of the f-θ lens on the modulation of the drawing light occur. To counter this error, the drawing beam is split, for example, by a beam splitter to produce a monitor beam which is deflected by the deflector in the main scanning direction. The deflected monitor light (referred to as a monitoring scanning beam) is transmitted through the f-θ lens and made incident upon a scale located at a position which is optically equivalent to the position of the subject. The scale is provided with a plurality of slit arrays along the main scanning direction. The modulation of the drawing beam is carried out based on the monitoring scanning beam transmitted through each slit is detected.

Thus, the drawing beam is modulated so as to cancel the error characteristics of the f-θ lens, so that the drawing scanning beam thus obtained is free from the error characteristics of the f-θ lens when the drawing scanning beam is transmitted through the f-θ lens.

Note that the scale whose length is longer than the effective main scanning length has a slit width which is an integer multiple of the drawing resolution in the main scanning direction.

Also known is a multiple beam type optical scanner in which the subject is scanned at different positions thereof in the sub-scanning direction by a plurality of drawing beams at one time to shorten the drawing time.

In such a known multiple beam type optical scanner, to prevent the adjacent drawing scanning beams in the sub-scanning direction from interfering with each other, the drawing scanning beam on the upstream side in the sub-scanning direction scans the subject slightly prior to the drawing scanning beam on the downstream side in the main scanning direction or vice versa.

In the known multiple beam type optical scanner, the first (most preceding) drawing beam which has not yet been deflected to obtain the drawing scanning beam in the main scanning direction is modulated at a timing corresponding to the monitoring scanning beam passes through a first predetermined area of the slits.

Moreover, each drawing beam is modulated at a timing corresponding to the monitoring scanning beam passing through a predetermined area of the slits that is deviated from the the first predetermined area in the downstream direction by a deviation corresponding to a difference in the scanning position in the main scanning direction between the leading drawing scanning beam and the respective subsequent drawing scanning beams.

Consequently, in the known multiple beam type optical scanner, there is a difference between the timing at which the drawing scanning beams other than the leading drawing scanning beam pass through the f-θ lens and the timing at which the monitoring scanning beam passes through the f-θ lens.

Due to the time difference, the timing at which each drawing beam is modulated to cancel the error characteristics of the f-θ lens is not identical to the timing at which the drawing scanning beam, subject to the error characteristics of the f-θ lens, is transmitted through the f-θ lens. Consequently, it is impossible to correctly cancel the error characteristics of the f-θ lens, resulting in a failure to draw the printed data onto the subject to be scanned at an identical or constant dot pitch. Thus, the image drawn on the subject is formed at different or irregular dot pitches.

This is particularly serious in a printer for precise printing, such as printing of a predetermined pattern onto a printed circuit board, formation of a master plate for a mimeograph, or a mask printing of a liquid crystal screen, etc., since if there is a deviation in the patterns drawn on the subject to be scanned or the patterns are drawn at irregular or different dot pitches, the quality of the print is deteriorated.

SUMMARY OF THE INVENTION

The primary object of the present invention is to provide an optical scanning apparatus in which a pattern or patterns is/are drawn on a subject to be scanned at an equal dot pitch using a plurality of drawing scanning beams at one time.

To achieve the object mentioned above, an optical image forming device is provided with a scanning lens in the scanner, for scanning in a main scanning direction, a plurality of drawing beams on an image plane. The device employs and a monitoring beam the drawing beams scanned simultaneously and repeatedly within a predetermined scanning range. The eight drawing beams are scanned such that drawing beams adjacent each other in a sub-scanning direction pass a same position in the scanning range on the image plane at a different time. The monitoring beam is scanned prior to scanning drawing beams. A scale clock generator is provided for generating scale clock signals identifying positions of the monitoring beam in the scanning range. A modulator modulates the eight drawing beams such that modulations for each of the drawing beams at a same position in the scanning range are synchronized with a timing of a same scale clock signal obtained by the scale clock generator.

In a further embodiment, the optical image forming device provides an auxiliary scanner which moves either the image plane or scanner in a direction normal to the main scanning direction and synchronous with the scanning in the main scanning direction.

The modulations of the modulator include a reading process and a modulating process. The reading process reads drawing data to be incorporated in the drawing beams in accordance with the same scale clock signal obtained by the scale clock generator. The modulating process gives ON/OFF information to each of the light sources of the drawing beams in accordance with the drawing data read at the reading process.

According to another aspect of the present invention, an optical image forming device includes a scanning lens for scanning in a main scanning direction eight drawing beams on an image plane. A monitoring beam and the drawing beams are scanned simultaneously and repeatedly in a predetermined scanning range. The eight drawing beams are scanned such that drawing beams adjacent to each other in a sub-scanning direction pass a same position in the scanning range on the image plane at a different time. The monitoring beam is scanned prior to scanning drawing beams. A scale clock generator is provided for generating scale clock signals identifying positions of the monitoring beam in the scanning range. A modulator modulates the eight drawing beams such that modulations for each of the drawing beams at a same position in the scanning range are synchronized with a timing of a same scale clock signal obtained by the scale clock generator. An acoustooptic element with eight transducers is further provided to and modulate each of the eight drawing beams individually. The eight transducers are actuated simultaneously with the scale clock signals. Each of the plurality of drawing beams is subject to modulation when passing through the same position.

Preferably, the optical image forming device includes an auxiliary scanner which moves either the image plane or scanner means in a direction normal to the main scanning direction synchronous with the scanning of main scanning direction.

The modulation for each of the drawing beams include a reading process and a modulating process. The reading process reads drawing data to be incorporated in the drawing beams in accordance with the same clock signal. The a modulating process gives ON/OFF information to each of the light sources of the drawing beams in accordance with the drawing data read at the reading process.

Preferably, a distance between one of the eight transducers and a corresponding one of the eight drawing beams passing through the acoustooptic element modulated by one that transducer is defined. The distance defined is based upon the time each of the eight drawing beams pass through the same position after the scale clock signals start to be outputted. That is, each distance is defined as the time necessary to modulate each of the eight drawing beams. Modulation is achieved when the eight transducers actuated by the scale clock signals of the scale clock generator affect the eight drawing beams may be equal to the time necessary for the eight drawing beams to pass through the same position after the scale clock signals are outputted.

The optical image forming device may also include a scale placed at a position optically equal to that of the image plane scanned. The scale has a plurality of slits formed thereon at equal intervals in a range corresponding to an entire length of the image plane along the same position. A light receiving element receives the monitoring beam passing through each of the plurality of slits and generates output pulse signals. The scale clock generator divides each of the pulse signals and outputs a scale clock signals every time the light receiving element receives the monitoring beam.

In another embodiment of the present invention the optical image forming device further includes a scale is placed at a position optically equal to that of the image plane scanned. The scale has a plurality of reflecting surfaces thereon at equal intervals in a range corresponding to an entire length of the image plane along the same position. A light receiving element receives the monitoring beam reflected by each of the reflecting surfaces and generates output pulse signals. The scale clock generator divides each of the pulse signals and outputs a scale clock signals every time the light receiving element receives the monitoring beam.

The optical image forming device may include a light source which generates a laser beam, a first optical dividing element which divides the laser beam into a drawing beam and the monitoring beam, and a second optical dividing element which divides the drawing beam into the plurality of drawing beams.

An optical element, such as an image rotator, may be provided which inclines the eight drawing beams on the image plane in a manner such that the drawing beams are aligned in a direction transverse to the same position.

In another embodiment, an optical element polarizes each of the eight drawing beams in a manner such that each of the plurality of drawing beams is transmitted through a predetermined position of the acoustooptic element.

According to yet another aspect of the present invention, an optical image forming device is provided with a scanning lens, in a scanner for scanning in a main scanning direction eight drawing beams on an image plane. The device employs a monitoring beam and the drawing beams scanned simultaneously and repeatedly within a predetermined scanning range. The eight drawing beams are scanned such that drawing beams adjacent each other in a sub-scanning direction pass a same position in the scanning range on the image plane at a different time. The monitoring beam is scanned prior to scanning of the drawing beams. A scale clock generator is provided for generating scale clock signals identifying the positions of the monitoring beam within the scanning range. A modulator modulates the eight drawing beams such that modulations for each of the drawing beams at a same position in the scanning range are synchronized with a timing of a same scale clock signal obtained by the scale clock generator. A memory stores the modulated data of each of the eight drawing beams. A delay for controlling the timing for reading the modulated data from the memory is provided such that a separate delay controls each of the eight drawing beams to be modulated.

In an embodiment, the optical image forming device further comprises an auxiliary scanner which moves either the image plane or scanner in a direction normal to the main scanning direction synchronous with the scanning in the main scanning direction.

The modulations of the modulator include a reading process and a modulation process. The reading process reads drawing data to be incorporated in the drawing beams in accordance with the same scale clock signal obtained by the scale clock generator. The modulating process gives ON/OFF information to each of the light sources of the drawing beams in accordance with the drawing data read at the reading process.

According to this aspect, the modulator can include an acoustooptic element through which the eight drawing beams pass. A plurality of transducers in the acoustooptic element modulate the drawing beams individually. Thus, the plurality of transducers are individually actuated by each delay and each of the drawing beams is modulated at the time they pass through the same position.

The delay associated with the first drawing beam can be actuated at a predetermined delay time after the scale clock signal is inputted. Each successive delay to be actuated after the one preceding it is actuated at a predetermined delay time after the preceding delay is actuated.

The present disclosure relates to subject matter contained in Japanese patent application No.05-187397 (filed on Jun. 30, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1A:
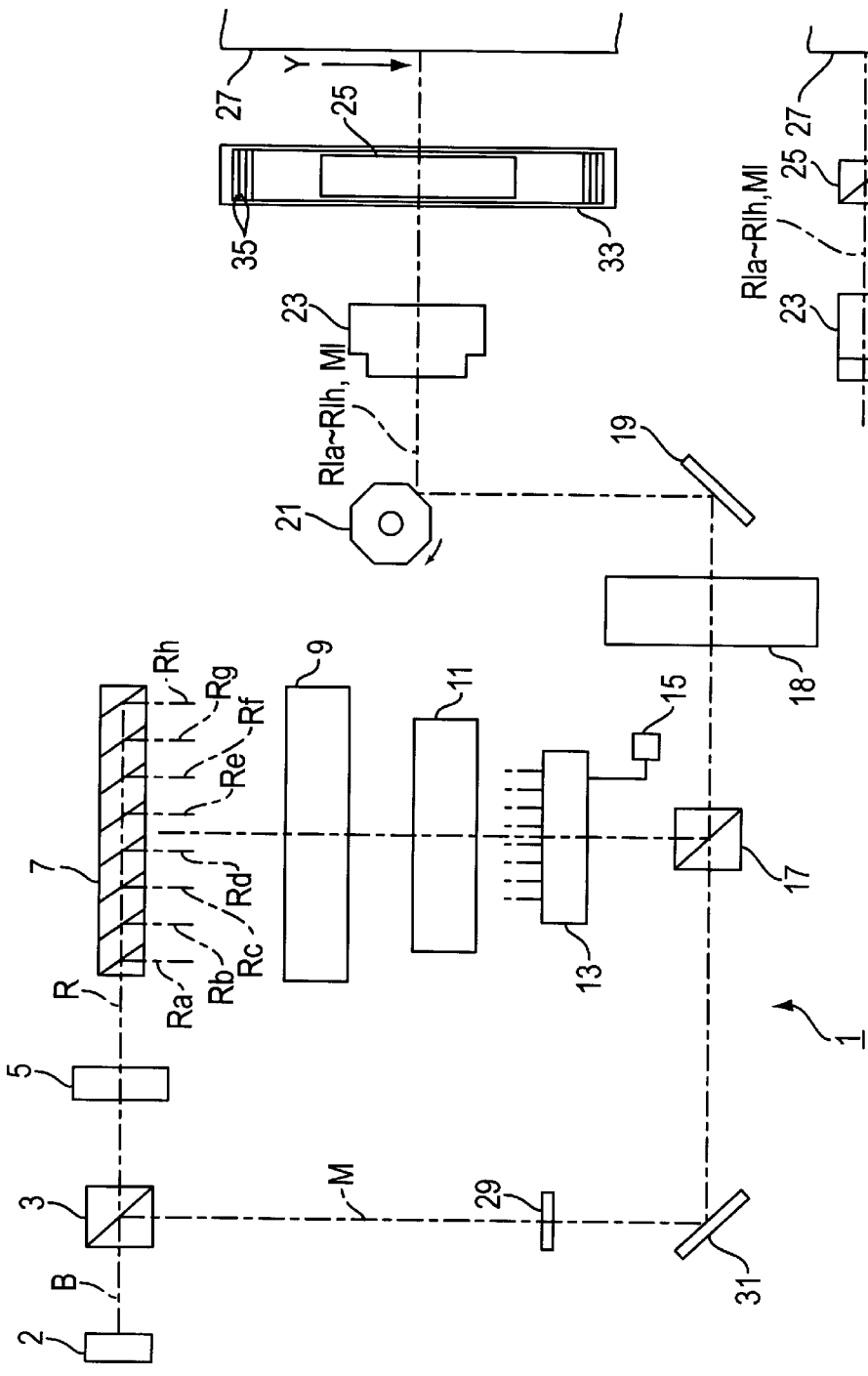
FIGS. 1A and 1B are a schematic view of an optical scanning apparatus and a side elevational view of a scale thereof, according to a first embodiment of the present invention, respectively.
Figure 1B:
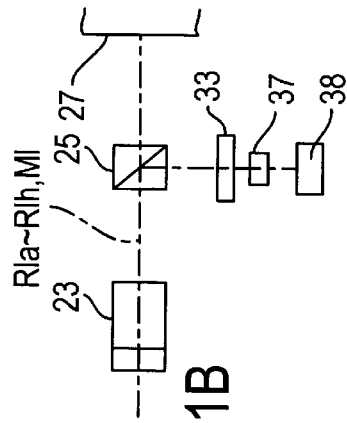

In an optical scanning apparatus 1 shown in FIGS. 1A and 1B, the laser beam B emitted from a light source 2 is split by a beam splitter 3 into drawing beam R and monitoring beam M.

The drawing beam R separated from the monitoring beam M by the beam splitter 3 is transmitted through an A/O modulator (acoustooptic modulator) 5 where an adverse effect by a possible inclination of a polygonal mirror 21, which will be discussed hereinafter, is eliminated and is split into eight drawing beams Ra through Rh by a beam splitter 7.

The eight drawing beams Ra through Rh are condensed by a condenser lens 9, transmitted through an image rotator 11 (i.e., an incident position adjusting means), and are made incident upon an A/O modulator (acoustooptic element) 13. The array of drawing beams Ra through Rh incident upon the A/O modulator 13 are inclined from (i.e., with respect to) the main scanning direction by the image rotator 11.

Figure 2A:
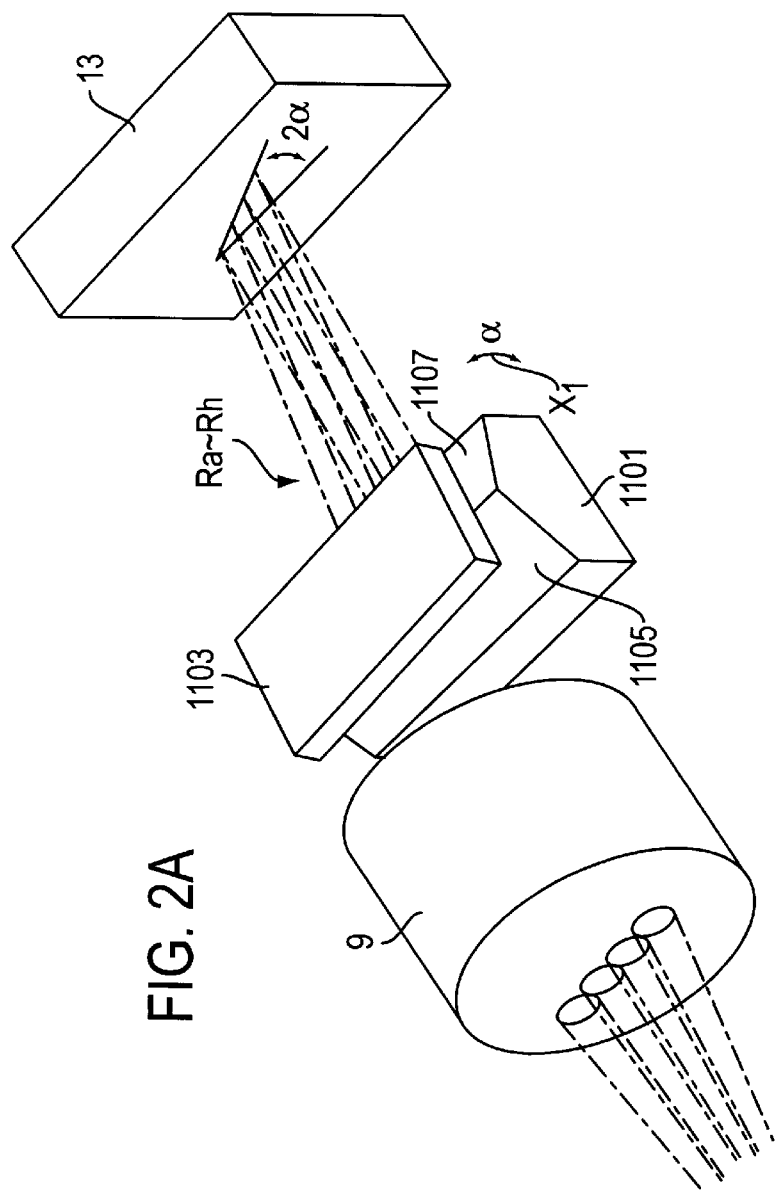
FIGS. 2A and 2B are an enlarged perspective view and a side elevational view of an image rotator shown in FIG. 1A, respectively.
Figure 2B:
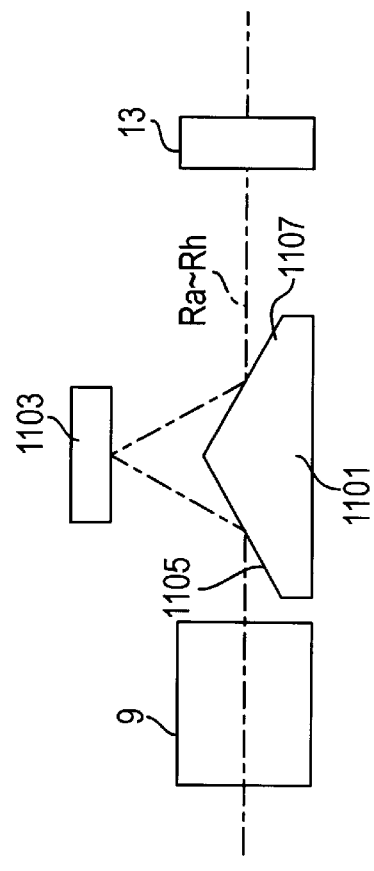

The image rotator 11 shown more clearly in FIGS. 2A and 2B is comprised of a first mirror 1101 having a convex mirror surface and a second mirror 1103 in the form of a plate and provided above the first mirror 1101. The drawing beams Ra through Rh transmitted through the condenser lens 9 are reflected by the first mirror surface 1105 of the first mirror 1101, the second mirror 1103 and the second mirror surface 1107 of the first mirror 1101 before being made incident upon the A/O modulator 13.

If the first mirror 1101 and the second mirror 1103 are inclined at an inclination angle of α in the direction of arrow x1 in FIG. 2A, the array of the drawing beams Ra through Rh to be incident upon the A/O modulator 13 is inclined at an angle of 2α in the direction x1 with respect to the main scanning direction Y.

In the illustrated embodiment, although the array of the drawing beams Ra through Rh is inclined at an angle 2 α by the image rotator 11 before being made incident upon the A/O modulator 13, as mentioned above, it is possible to rotatably support the A/O modulator 13 by a rotating support (not shown), so that when the A/O modulator 13 is rotated by the rotating support in a direction opposite to the direction x1, the array of the drawing beams Ra through Rh to be incident upon the A/O modulator 13 is inclined. In this alternative, the rotating support constitutes the incident position adjusting means.

Figure 3:
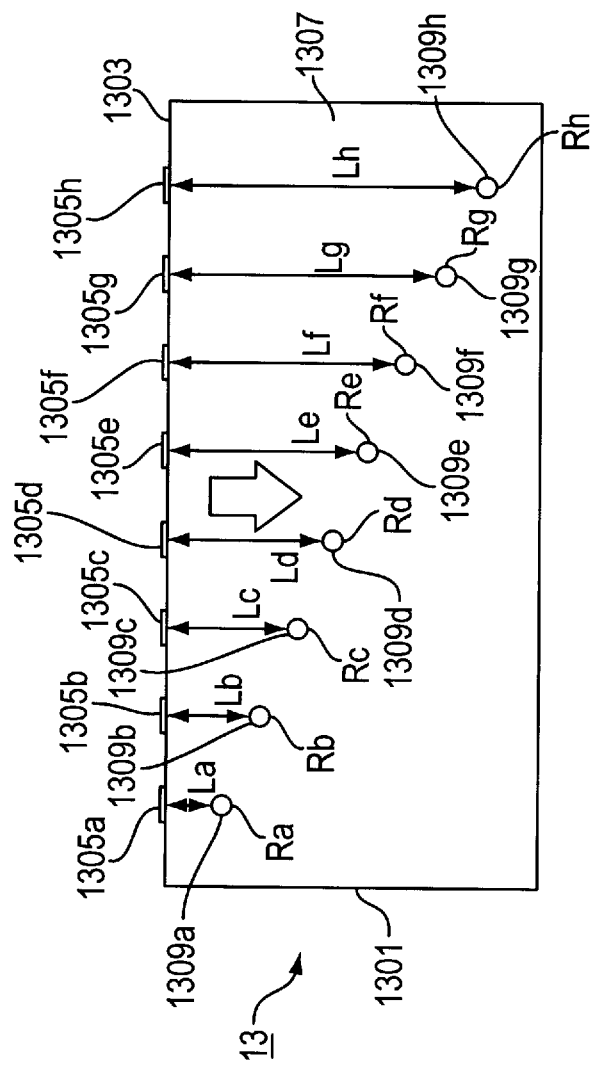
FIG. 3 is a front elevational view of an A/O modulator shown in FIG. 1A.

The A/O modulator 13, as shown in FIG. 3, is an eight channel type comprised of a crystal body 1301 and eight transducers 1305a through 1305h provided on the upper surface 1303 of the crystal body 1301. The drawing beam Ra through Rh whose array direction has been inclined by the image rotator 11 are made incident upon the front surface 1307 of the A/O modulator 13.

The drawing beams Ra through Rh are modulated depending on the pattern to be drawn, in accordance with the modulation signals inputted to the transducers 1305a through 1305h from a modulation signal outputting circuit 15. The modulated drawing beams Ra through Rh are transmitted through the polarization beam splitter 17 and reflected by a reflecting mirror 19 towards the polygonal mirror (optical deflector) 21.

An Image rotator 18 is provided between the polarization beam splitter 17 and the reflecting mirror 19. The image rotator 18 adjusts the first through eighth drawing scanning beams R1a through R1h to scan on the subject 27 the positions which are different from one another in the sub-scanning direction and are deviated from one another in the main scanning direction so that the first through eighth drawing scanning beams R1a through R1h do not interfere with one another.

The drawing beams Ra through Rh are reflected by the polygonal mirror 21, so that the drawing scanning beams are deflected in the main scanning direction Y (corresponding to the scanning direction) in FIG. 1. The drawing scanning beams R1a through R1h are then made incident upon the subject 27 to be scanned, such as a photosensitive drum, through an f-θ lens 23 and a polarization beam splitter 25. The polygonal mirror 21 is rotated by a spindle motor (not shown) in synchronization with the drawing beams.

The photosensitive drum 27 is rotated intermittently by a motor driving means (not shown) in synchronization with the drawing scanning beams. When the modulated drawing beams R1a through R1h scan a scanning range upon the photosensitive drum 27, the photosensitive drum 27 rotates through a predetermined angle. The modulated drawing scanning beams R1a through R1h scan the next scanning range. In this embodiment, the above operation is repeated.

Figure 4:
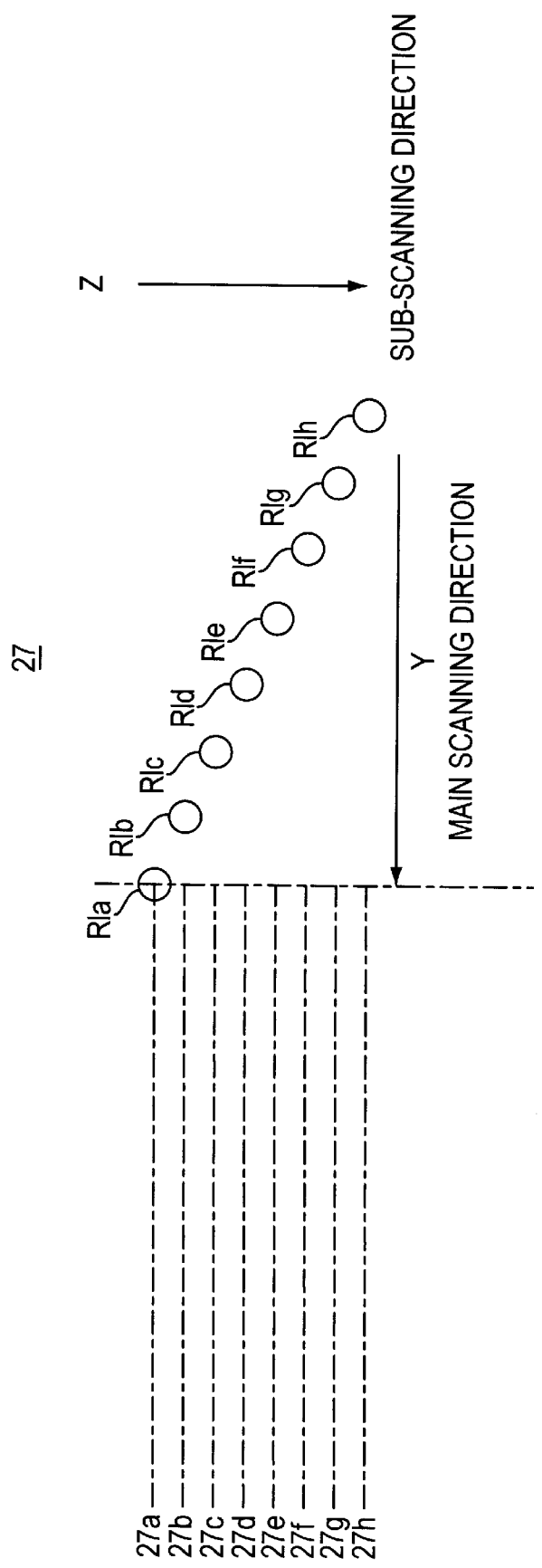
FIG. 4 is an explanatory view of scanning positions on a subject to be scanned, using first through eighth drawing scanning beams deflected by a polygonal mirror shown in FIG. 1.

FIG. 4 shows scanning portions of the subject 27 at an instant during the scanning by the first through eighth drawing scanning beams R1a through R1h. The drawing scanning beams R1a–R1h are obtained by deflecting drawing beams Ra off Rh through the polygonal mirror 21 in the main scanning direction Y. As may be seen in FIG. 4, in the optical scanner 1 of the illustrated embodiment, the imaginary main scanning lines 27a through 27h of the subject 27 that are spaced in the main scanning direction Y and the sub-scanning direction Z perpendicular to the main scanning direction are simultaneously scanned by the eight modulated drawing scanning beams R1a through R1h.

The first through eighth modulated drawing scanning beams R1a through R1h incident upon the subject 27 at positions which are deviated from one another in the sub-scanning direction and also deviated from one another in the main scanning direction so that the first through eighth modulated drawing beams R1a through R1h do not interfere with one another.

In this embodiment, the modulated drawing scanning beams R1a through R1h are aligned in a direction intersecting the main scanning direction upon the subject 27 to be scanned. The modulated drawing scanning beams R1a through R1h scan the same points in the scanning range at different times. Thus, there is no interference between the adjacent drawing scanning beams R1a through R1h in the sub-scanning direction Z.

FIG. 3 shows the distances La through Lh between the positions 1309a through 1309h of the drawing beams Ra through Rh incident upon the front surface 1307 of the A/O modulator 13, and the corresponding transducers 1305a through 1305h increasing from La to Ih. The distance Lh is inversely proportional to the amount which the first through seventh drawing scanning beams R1a through R1g precedes the eighth drawing scanning beam R1h in the main scanning direction Y, taking into account the acoustic propagation velocity of the A/O modulator 13.

The monitoring beam M split by the beam splitter 3 is incident upon a λ/2 plate 29 where the plane of polarization is rotated by 90° and then transmitted through a reflecting mirror 31 towards the polarization beam splitter 17. The monitoring beam M is transmitted through the polarization beam splitter 17 and reflected by a reflecting mirror 19 towards the polygonal mirror 21. The polygonal mirror 21 deflects monitoring beam M in the main scanning direction Y.

The monitoring beam M deflected by the polygonal mirror 21 in the main scanning direction Y is transmitted through the f-θ lens 23 as a monitoring scanning beam and is then reflected by the polarization beam splitter 25 toward the scale 33 provided at a position which is optically equivalent to the subject 27 to be scanned.

The monitoring beam M is incident upon the polygonal mirror 21 preceding the first modulated drawing scanning beam R1a in main scanning direction Y. Consequently, the time at which the monitoring scanning beam M1 passes through the f-θ lens 23 is earlier than the time at which the first drawing scanning beam R1a passes through the f-θ lens 23.

Figure 5:
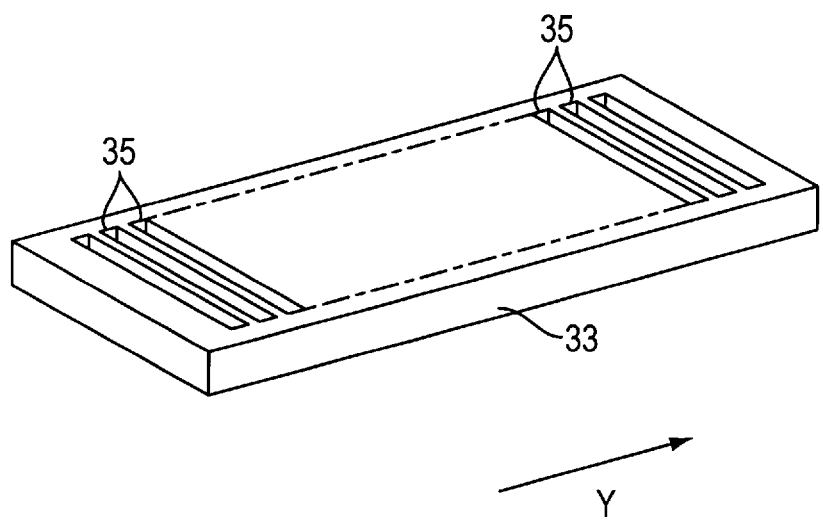
FIG. 5 is a perspective view of a scale shown in FIG. 1.

FIG. 5 shows a perspective view of scale 33 which is illuminated with the monitoring scanning beam M1 which is obtained by reflecting the monitoring scanning beam M by the polarization beam splitter 25. The scale 33 is provided with a plurality of slits 35 which are spaced from one another in the scanning direction of the monitoring scanning beam M1, i.e., the main scanning direction Y.

The monitoring scanning beam M1 incident upon the scale 33 and transmitted through the slits 35 is detected by detecting means (e.g., an optical detector) 37, shown in FIG. 1B, which outputs pulse signals whose pulse interval corresponds to the time at which the monitoring scanning beam M1 passes through the scale 33. The pulse signals are divided into several tens (i.e., in multiples of ten) by a frequency divider (i.e., circuit) 38 so as to make the number of the slits 35 correspond to the density (i.e., number) of drawing dots on the subject 27. Thereafter, the divided pulse signals are inputted to the modulation signal outputting circuit 15 as a scale clock signal.

Figure 1C:
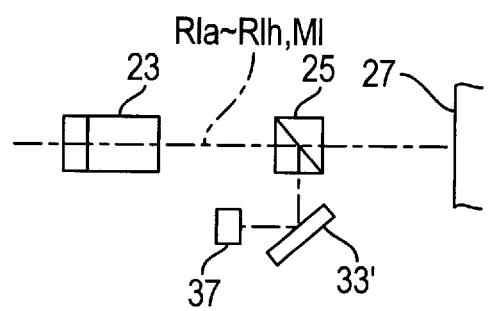
FIG. 1C is a side elevational view of another embodiment of a scale.

The scale 33 may be replaced with a scale 33' shown in FIG. 1C which reflects the monitoring beam. The scale 33' has a plurality of mirror portions spaced from one another In the main scanning direction of the monitoring scanning beam M1.

The modulation signal outputting circuit 15 is provided with a memory (not shown) in which data (drawing data) of a pattern to be drawn on the subject 27 by the drawing beams Ra through Rh is stored. The stored drawing data is read from the memory in synchronization with the scale clock signal outputted from the frequency divider 38. The stored drawing data is likewise input to transducers 1305a through 1305h of the A/O modulator 13 as modulation signals (i.e., ON/OFF signals for the light sources of the drawing beams).

In the optical scanner 1 as constructed above, when the modulation signals are inputted to the transducers 1305a through 1305h of the A/O modulator 13, the modulation signals are converted to acoustic wave signals by the transducers and propagated toward the incident positions 1309a through 1309h of the drawing beams Ra through Rh, respectively.

The modulation signal converted to an acoustic wave signal by the transducer 1305a reaches the incident position 1309a of the first drawing beam Ra earlier than the modulation signal converted to an acoustic wave signal by the transducer 1305b reaches the incident position 1309b of the second drawing beam Rb. The time difference corresponds to the amount of time that the first drawing scanning beam R1a in the main scanning direction Y precedes the second drawing scanning beam R1b. Hence, the modulation (i.e., intensity modulation) of the first drawing beam Ra takes place in accordance with the modulation signal at an earlier time than the modulation of the second drawing beam Rb.

Similarly, the modulation signals which have been converted to acoustic wave signals by the respective transducers 1305b through 1305h reach the incident positions 1309b through 1309g of the second through seventh drawing scanning beams R1b through R1g earlier than the the modulation signals which have been converted to acoustic wave signals by the subsequent transducers 1305c through 1305h reach the incident positions 1309c through 1309h of the subsequent drawing scanning beams R1c through R1h. The time difference corresponds to the amount of time that the second through seventh drawing scanning beams R1b through R1g in the main scanning direction Y precede the third through eighth drawing scanning beam R1c through R1h, respectively. As a result, the modulation of the first through eighth drawing scanning beams R1a through R1h takes place in accordance with the modulation signals at the incident positions 1309a through 1309h, respectively.

An auxiliary scanning means moves at least one of the image plane and the scanning means in a direction normal to the main scanning direction synchronous with the scanning in the main scanning direction.

As can be understood from the foregoing, the modulations of the drawing beams in the A/O modulator 13 are carried out at different positions corresponding to the time differences among the drawing scanning beams R1a through R1h in the main scanning direction Y. The modulation signals are generated from the modulation signal outputting circuit 15 such that the timing of modulation of the second through eighth drawing beams Rb through Rh by the A/O modulator 13 are identical to the timing of scanning of the predetermined areas of the subject 27 by the second through eighth drawing scanning beams R1b through R1h obtained by deflecting the drawing beams Rb through Rh, respectively.

Note that in the optical scanner 1 of the present invention, there is a slight time delay caused by the dividing operation of the pulse signals outputted from the optical detector 37 by the frequency divider 38. This delay will affect the modulation of the first drawing scanning beam R1a in accordance with the modulation signal outputted from the modulation signal outputting circuit 15 by the A/O modulator 13, etc.

To compensate for this, in the illustrated embodiment, the distance La between the incident position 1309a of the first drawing beam Ra upon the A/O modulator 13 and the corresponding transducer 1305a is determined. This determination takes into account the difference (amount of precedence) in time between the passage through the f-θ lens 23 by the monitoring scanning beam M1 and passage through the f-θ lens 23 by the first drawing scanning light R1a and the time necessary for the dividing operation and the modulation, etc., mentioned above.

Therefore, the time at which the characteristics of the first drawing beam Ra are altered to cancel the error characteristics of the f-θ lens 23 during the modulation thereof by the A/O modulator 13 in accordance with the scale clock signal is identical to the time at which the first drawing scanning beam R1a passes through the f-θ lens 23 and is influenced by the error characteristics thereof.

As a result, there is a coincidence in time of the modulation of the second through eighth drawing beams Rb through Rh by the A/O modulator 13 and the scanning of the predetermined areas of the subject 27 by the corresponding drawing scanning beams R1b through R1h. The times to cancel the error characteristics of the f-θ lens 23 are imparted to the second through eighth drawing beams Rb through Rh, during the modulation thereof by the A/O modulator 13 in accordance with the scale clock signals, are coincident with the times at which the second through eighth drawing scanning beams R1b through R1h (which are obtained by deflecting the second through eighth drawing beams Rb through Rd) pass through the f-θ lens 23 and are subject to an effect of the error characteristics of the f-θ lens 23.

Consequently, according to the present invention, the adverse effect of the error characteristics of the f-θ lens 23 on the drawing scanning beams R1a through R1h can be cancelled and eliminated by the counter characteristics imparted to the drawing beams Rb through Rh during the modulation thereof by the A/O modulator 13 in accordance with the scale clock signals. As a result, it is possible is to prevent an image from being drawn on the subject 27 with unequal dot pitches, thus resulting in an improved linearity of modulation.

Although the timings of the modulation of the first through eighth drawing beams Ra through Rh by the A/O modulator 13 are changed by varying the distances La through Lh (between the incident positions 1309a through 1309h of the drawing beams Ra through Rh on the A/O modulator 13 and the corresponding transducers 1305a through 1305h in the illustrated embodiment) it is possible to electrically retard the input timings of the modulation signals into the transducers 1305a through 1305h to thereby vary the modulation timings of the drawing beams Ra through Rh.

Figure 6:
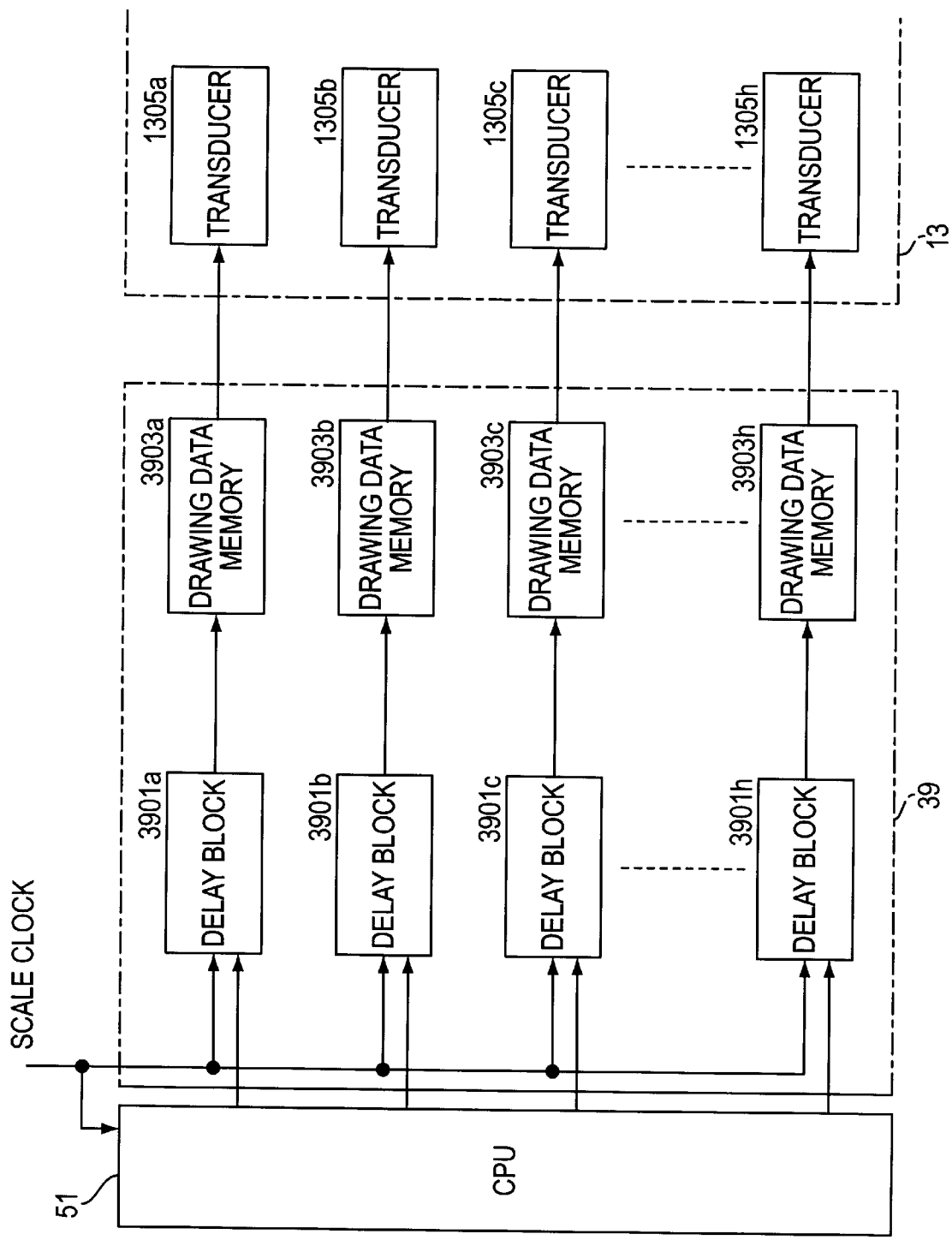
FIG. 6 is a block diagram of a modulation signal outputting circuit having delay circuits (delay blocks) which electrically retard the input timing of the modulation signals to be inputted to transducers shown in FIG. 3, according to a second embodiment of the present invention; and, FIG. 7 is a block diagram showing a structure of each delay block shown in FIG. 6.

FIG. 6 shows a modulation signal outputting circuit according to a second embodiment of the present invention, in which the input timings of the modulation signals into the transducers 1305a through 1305h are electrically delayed by delay circuits (i.e., delay blocks). In FIG. 6, a modulation signal outputting circuit (corresponding to a delay circuit) 39 is provided instead of the modulation signal outputting circuit 15 in the first embodiment illustrated In FIG. 1, and includes eight delay blocks 3901a, 3901b, 3901c, . . . 3901h and drawing data memories 3903a, 3903b, 3903c, . . . 3903h.

Figure 7:
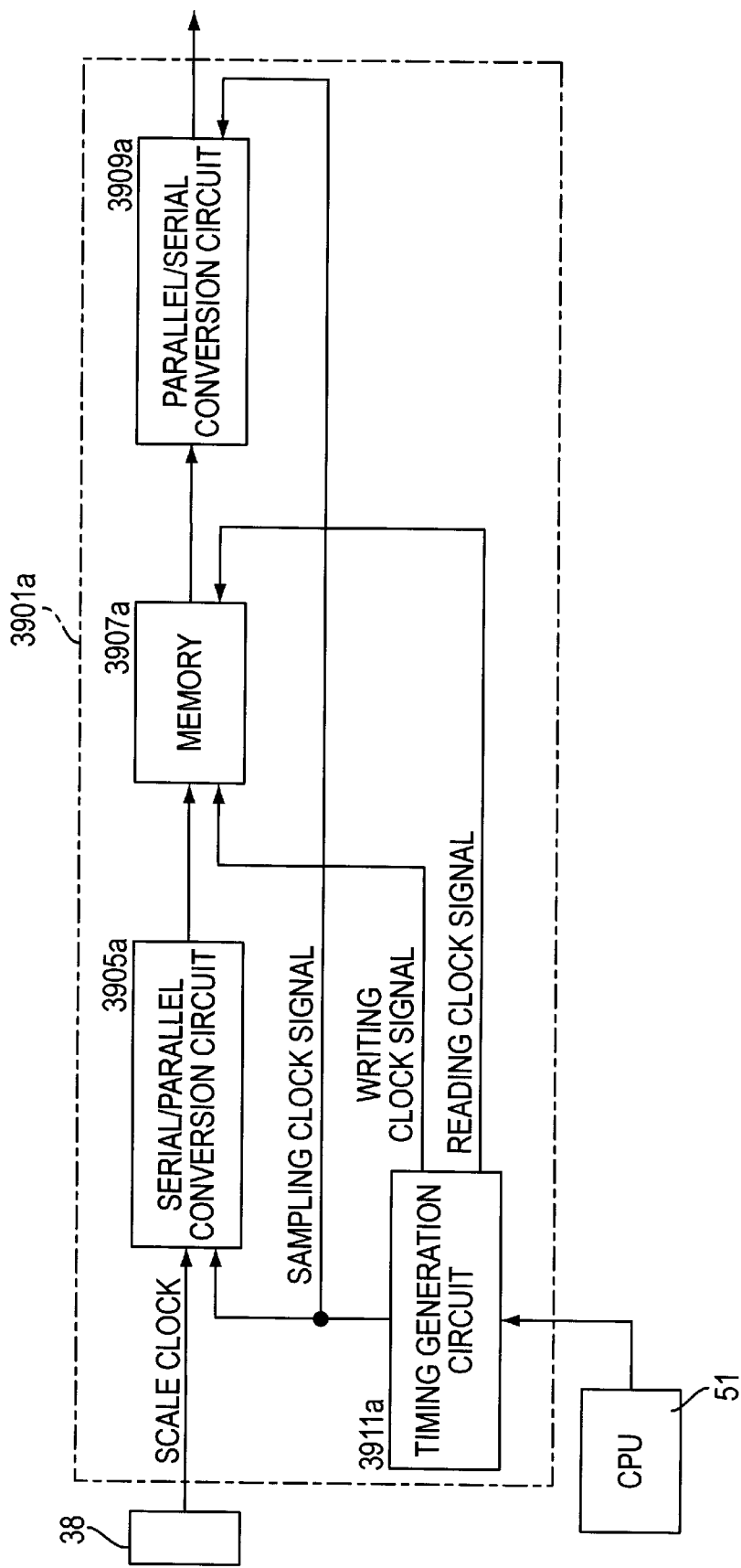

The delay block 3901a, shown in FIG. 7, retards the scale clock signal and is comprised of a serial/parallel conversion circuit 3905a, a memory 3907a, a parallel/serial conversion circuit 3909a, and a timing generation circuit 3911a.

The scale clock signal divided by the frequency divider 38 is inputted to the serial/parallel conversion circuit 3905a in which a parallel conversion of the scale clock signal is carried out at a time at which a sampling clock signal is generated by the timing generation circuit 3911a.

The scale clock signal whose parallel conversion has been completed is temporarily stored in the memory 3907a in accordance with a writing clock signal outputted from the timing generation circuit 3911a, and thereafter is outputted from the memory 3907a into the parallel/serial conversion circuit 3909a in accordance with a reading clock signal outputted from the timing generation circuit 3911a.

The serial conversion of the scale clock signal read from the memory 3907a is carried out in the parallel/serial conversion circuit 3909a and is executed at a time at which the sampling clock signal is generated from the timing generation circuit 3911a. After the serial conversion of the scale clock signal is completed, the scale clock signal is sent from the parallel/serial conversion circuit 3909a into the drawing data memory 3903a.

In the delay block 3901a, the timing generation circuit 3911a is controlled by a CPU 51 which generally controls the whole operation of the apparatus, so that the time from the output of the writing clock signal into the memory 3907a to the output of the reading clock signal from the memory 3907a is adjusted to correspond to the time difference in the main scanning direction between the monitoring scanning beam M1 and the first drawing scanning beam R1a.

The delay blocks 3901b, 3901c, . . . 3901h are constructed similar to the delay block 3901a. In the timing generation circuits (not shown) of the delay blocks 3901b, 3901c, . . . 3901h, the time from the output of the writing clock signals into the respective memories 3907b, 3907c, . . . 3907h to the output of the reading clock signals from the memories are adjusted by the CPU 51 to correspond to the time differences between the first through eighth drawing scanning beams R1a through R1h in the main scanning direction.

Consequently, the scale clock signals are delayed in the delay blocks 3901b, 3901c, . . . 3901h, similar to the delay block 3901a. After the serial conversion of the scale clock signals is completed by the parallel/serial conversion circuit, the scale clock signals are outputted to the drawing data memories 3903b, 3903c, . . . 3903h, respectively.

The drawing data memories 3903a, 3903b, . . . 3903h store drawing data of an image to be drawn on the subject 27 by the first through eighth drawing beams Ra through Rh. The drawing data stored in the respective memories 3903a, 3903b, . . . 3903h are read therefrom at a speed corresponding to the scale clock signals outputted from the delay blocks 3901a, 3901b, . . . 3901h and are inputted to the respective transducers 1305a, 1305b, 1305c, . . . 1305h of the A/O modulator 13 as modulation signals.

In the second embodiment shown in FIG. 6, in which the modulation signal outputting circuit 39 is employed, since the modulation signals inputted to the transducers 1305a, 1305b, 1305c, . . . 1305h of the A/O modulator 13 are individually delayed by the modulation signal outputting circuit 39, the image rotator 11 provided between the condenser lens 9 and the A/O modulator 13 in the first embodiment can be dispensed with. In the second embodiment, the first through eighth drawing beams Ra through Rh, which are arrayed in a horizontal direction, are made incident upon the front surface 1307 of the A/O modulator 13, so that the distances La through Lh between the incident positions 1309a through 1309h and the respective transducers 1305a through 1305h are identical (i.e., La=Lb=Lc=. . . =Lh).

With this arrangement, the same technical effects as those in the first embodiment can be obtained in the second embodiment.

As mentioned above, in the modulation signal outputting circuit 39 shown in FIG. 6, the scale clock signals outputted from the frequency divider 38 are individually delayed depending on the time difference in the main scanning direction Y between the monitoring scanning beam M1 and each of the first through eighth drawing beams R1a through R1h in the main scanning direction Y.

However, the structure of the modulation signal outputting circuit is not limited to that of the illustrated embodiment. For instance, the scale clock signal outputted from the frequency divider 38 is delayed by a predetermined time by the first transducer and is outputted to the first drawing data memory and the subsequent (i.e., second) transducer, so that the scale clock signal from the frequency divider 38 is delayed by a predetermined time by the second transducer. The delayed scale clock signal is outputted to the second drawing data memory and the subsequent (i.e., third) transducer, so that the scale clock signal from the frequency divider 38 is delayed by a predetermined time by the third transducer. The same operations are repeated.

The present invention is not limited to the illustrated first or second embodiment. For example, the light source of the monitoring beam can be separate from the light source of the drawing beam, a plurality of light sources for a plurality of drawing beams can be provided, or, more than eight drawing beams can be used to scan the subject at one time. In particular, the optical arrangement in the second embodiment can be advantageously applied to an optical scanner in which the modulation of the drawing beam is executed by a device other than the A/O modulator.

As can be understood from the foregoing, according to the present invention, an optical scanning apparatus includes an optical deflector which deflects first drawing light, a monitoring beam adapted to obtain a modulation timing of the first drawing light, and a plurality of second drawing beams separate from the first drawing light, in a predetermined scanning direction. The apparatus further includes a scale which is provided in an optical path of a monitoring scanning beam which is obtained by deflecting the monitoring beam in the scanning direction and which has a plurality of slits spaced from one another in the scanning direction. A detecting unit for detecting the monitoring scanning beam transmitted through the slits to output scale clock signals, a first modulating device for modulating the first drawing light in accordance with the scale clock signals, and a second modulating device for the second drawing beams, for modulating the corresponding second drawing beams in accordance with the scale clock signals are provided. A subject to be scanned is scanned at a first scanning area thereof by first drawing scanning beam which is obtained by deflecting the first drawing beam in the scanning direction. A plurality of scanning areas of the subject spaced from the first scanning area on the downstream side of the scanning direction and spaced from one another in a direction perpendicular to the scanning direction are scanned by second drawing scanning beams which are obtained by deflecting the second drawing beams at one time. Provision is made for a plurality of delay devides for retarding the scale clock signals depending on a difference in scanning position on the subject in the scanning direction between the first drawing scanning beam and the second drawing scanning beams. The second modulating unit modulates the corresponding second drawing beams in accordance with the scale clock signals delayed by the delay device.

Consequently, the timing of the modulation of the second drawing beams is coincident with the timing of the scanning of the predetermined areas of the subject by the second drawing scanning beams which are obtained by deflecting the second drawing beams, and the time at which the characteristic to cancel the error characteristics of the f-θ lens is imparted to the second drawing scanning lights upon modulation is coincident with the time at which the second drawing scanning beams pass through the f-θ lens and are subject to the adverse effect of the error characteristics thereof. Hence, the error characteristics of the f-θ lens can be cancelled and eliminated. As a result, the image will not be drawn on the subject at unequal dot pitches, resulting in an improved modulation linearity.

I claim:

1. An optical image forming device comprising:

a scanning device comprising a scanning lens for scanning, in a predetermined scanning range in a main scanning direction, a plurality of drawing beams on an image plane and a monitoring beam;

said plurality of drawing beams being scanned such that drawing beams adjacent to each other in a sub-scanning direction pass a predetermined position in the scanning range on said image plane at a different time, said sub-scanning direction being transverse to said main scanning direction, said monitoring beam being scanned prior to scanning said drawing beams;

a scale clock generator that generates scale clock signals based on said monitoring beam which passed through said scanning lens for identifying positions of said monitoring beam in said scanning range;

means for modulating said plurality of drawing beams in accordance with drawing data; and means for setting modulating timing of said modulating means for each of said drawing beams in accordance with said scale clock signals generated by said scale clock generator, said setting means including means for delaying the timing of modulating each of said drawing beams so that modulations for each of said drawing beams at a corresponding position in said main scanning direction are completed synchronously with a same clock signal of a series of said scale clock signals generated by said scale clock generator.

2. The optical image forming device of claim 1, further comprising means for auxiliary scanning which moves at least one of said image plane and said scanning means in a direction normal to said main scanning direction synchronously with the scanning in said main scanning direction.

3. The optical image forming device of claim 1, wherein said modulations include a reading process which reads drawing data to be transmitted in said drawing beams in accordance with said corresponding clock signal, and a modulating process which imparts ON/OFF information to each light source of said drawing beams in accordance with said drawing data read at said reading process.

4. An optical image forming device comprising:

a scanning device comprising a scanning lens for scanning, in a predetermined scanning range in a main scanning direction, a plurality of drawing beams on an image plane and a monitoring beam;

said plurality of drawing beams being scanned such that drawing beams adjacent to each other in a sub-scanning direction pass a predetermined position in the scanning range on said image plane at a different time, said sub-scanning direction being transverse to said main scanning direction, said monitoring beam being scanned prior to scanning said drawing beam;

a scale clock generator that generates scale clock signals based on said monitoring beam which passed said scanning lens for identifying positions of said monitoring beam in said scanning range;

an acoustooptic element through which said plurality of drawing beams pass, said acoustooptic element modulating each of said drawing beams individually;

said acoustooptic element including a plurality of transducers, each transducer being simultaneously actuated with another of said plurality of transducers in accordance with said scale clock signals generated by said scale clock generator; and means for delaying modulating timing for each of said plurality of drawing beams so that modulations for each of said drawing beams at a same position in said main scanning direction are completed synchronously with a corresponding scale clock signal of a series of said scale clock signals generated by said scale clock generator.

5. The optical image forming device of claim 4, further comprising means for auxiliary scanning which moves at least one of said image plane and said scanning means in a direction normal to said main scanning direction synchronously with the scanning of said main scanning direction.

6. The optical image forming device of claim 4, wherein said modulations include a reading process which reads drawing data to be incorporated in said drawing beams in accordance with said corresponding clock signal, and a modulating process which imparts ON/OFF information to each light source of said drawing beams in accordance with said drawing data read at said reading process.

7. The optical image forming device of claim 4, wherein a distance between one of said plurality of transducers and one of said plurality of drawing beams, which passes through said acoustooptic element and is modulated by said one of said plurality of transducers, is defined based upon a time at which each of said plurality of drawing beams passes through said predetermined position after said scale clock signals start to be outputted.

8. The optical forming device of claim 4, wherein a distance between one of said plurality of transducers and a point at which one of said plurality of drawing beams is incident to said acoustooptic element and is modulated by said one of said plurality of transducers is defined so that a time necessary for a modulation effect to reach said plurality of drawing beams may is substantially equal to a time necessary for said plurality of drawing beams to pass through said predetermined position after said scale clock signals are outputted.

9. The optical image forming device of claim 4, wherein said optical image forming device further comprises:

a scale located at a position related to that of said image plane scanned by said plurality of drawing beams, said scale comprising a plurality of slits formed on said scale at equivalent intervals in a range corresponding to an entire length of said image plane along said main scanning direction; and a light receiving element which receives said monitoring beam having passed through each of said plurality of slits, wherein said light receiving element outputs pulse signals, and further wherein said scale clock generator divides each of said pulse signals to output said scale clock signals every time said light receiving element receives said monitoring beam.

10. The optical image forming device of claim 4, wherein said optical image forming device further comprises:

a scale located at a position related to that of said image plane scanned by said plurality of drawing beams, said scale comprising a plurality of reflecting surfaces formed on said scale at equivalent intervals in a range corresponding to an entire length of said image plane along said main scanning direction; and a light receiving element which receives said monitoring beam having been reflected by each of said plurality of reflecting surfaces, wherein said light receiving element outputs pulse signals, and further wherein said scale clock generator device divides each of said pulse signals to output said scale clock signals every time said light receiving element receives said monitoring beam.

11. The optical image forming device of claim 4, further comprising:

a light source which generates a laser beam;

a first optical dividing element which divides said laser beam into a drawing beam and said monitoring beam; and a second optical dividing element which divides said drawing beam into said plurality of drawing beams.

12. The optical image forming device of claim 11, further comprising an optical element which inclines said plurality of drawing beams on said image plane such that said plurality of drawing beams are aligned in a direction transverse to said main scanning direction.

13. The optical image forming device of claim 11, further comprising an optical element which deflects each of said plurality of drawing beams such that each of said plurality of drawing beams is transmitted through a predetermined position of said acoustooptic element.

14. The optical image forming device of claim 13, wherein said optical element is an image rotator.

15. An optical image forming device comprising:

scanning means comprising a scanning lens for scanning, in a main scanning direction, a plurality of drawing beams on an image plane and a monitoring beam in a predetermined scanning range;

said plurality of drawing beams being scanned such that drawing beams adjacent to each other in a sub-scanning direction pass a predetermined position in the scanning range on said image plane at a different time, said sub-scanning direction being transverse to said main scanning direction, said monitoring beam being scanned prior to scanning said drawing beams;

a scale clock generator that generates scale clock signals based on said monitoring beam which passed through said scanning lens for identifying positions of said monitoring beam in said scanning range;

an acoustooptic device through which said plurality of drawing beams pass, said acoustooptic device modulating each of said drawing beams individually;

a plurality of memory devices for storing drawing data of each of said plurality of drawing beams; and a plurality of delay devices for controlling a timing for reading said drawing data from said plurality of memory devices in accordance with said scale clock signals obtained by said scale clock generator so that modulations for each of said drawing beams at a same position in said main scanning direction are completed synchronously with a corresponding scale clock signal of a series of said scale signals generated by said scale clock generator.

16. The optical image forming device according to claim 15, further comprising means for auxiliary scanning which moves at least one of said image plane and said scanning means in a direction normal to said main scanning direction synchronously with the scanning in said main scanning direction.

17. The optical image forming device according to claim 15, wherein said modulations include a reading process which reads a drawing data to be transmitted by said drawing beams in accordance with said same clock signal, and a modulating process which imparts ON/OFF information to each light source of said drawing beams in accordance with said drawing data read at said reading process.

18. The optical image forming device of claim 15, wherein said acoustooptic device includes a plurality of transducers which modulate said drawing beams individually, wherein said plurality of transducers are individually actuated by said plurality of delay devices and modulate each of said drawing beams at a time at which each of said drawing beams passes through said main position.

19. The optical image forming device of claim 15, wherein each of said delay devices is actuated at a time at which a predetermined delay time set for each of said delay devices elapses, from a time said scale clock signal is inputted.

20. The optical image forming device of claim 15, wherein one of said plurality of delay devices which is to be first actuated is actuated at a time at which a predetermined delay time set for said one of said plurality of delay devices elapses, from a time said scale clock signal is inputted, and wherein each of another of the said plurality of delay devices which is to be actuated after said one of said plurality of delay devices is first actuated is actuated at a predetermined time which is set for said each of another said plurality of delay devices and that elapses from a time one of said plurality of delay devices having been actuated immediately before each of another of said plurality of delay devices is actuated.

* * * * *

UNITED STATES PATENT AND TRADEMARK OFFICE
CERTIFICATE OF CORRECTION

PATENT NO. : 5,844,592
DATED : December 1, 1998
INVENTOR(S) : T. IIZUKA

It is certified that error appears in the above-indentified patent and that said Letters Patent is hereby corrected as shown below:

At column 12, line 40 (claim 1, line 25) of the printed patent, "corresponding" should be —same.—

At column 12, line 42 (claim 1, line 27) of the printed patent, "same" should be —corresponding—.

At column 13, line 28 (claim 6, line 4) of the printed patent, after "corresponding" insert —scale—.

At column 15, line 7 (claim 17, line 3) of the printed patent, "a" should be —said—.

At column 16, line 13 (claim 20, line 9) of the printed patent, after "another" insert —of—.

Signed and Sealed this

Thirteenth Day of June, 2000

*Attest:*

Q. TODD DICKINSON

*Attesting Officer*  *Director of Patents and Trademarks*